United States Patent [19]
Weglein et al.

[11] Patent Number: 5,757,723
[45] Date of Patent: May 26, 1998

[54] METHOD OF PROCESSING DATA REPRESENTING ENERGY PASSING THROUGH A MEDIUM

[75] Inventors: Arthur Benjami Weglein, Plano; Fernanda Araujo Gasparotto, Houston, both of Tex.

[73] Assignees: Schlumberger Technology Corporation, Sugar Land; Atlantic Richfield Company, Plano, both of Tex.

[21] Appl. No.: 628,718
[22] PCT Filed: Oct. 13, 1994
[86] PCT No.: PCT/GB94/02246
§ 371 Date: Jul. 1, 1996
§ 102(e) Date: Jul. 1, 1996
[87] PCT Pub. No.: WO95/10787
PCT Pub. Date: Apr. 20, 1995

[30] Foreign Application Priority Data

Oct. 13, 1993 [GB] United Kingdom ............ 9321125.8

[51] Int. Cl.$^6$ .................................................. G01V 1/36
[52] U.S. Cl. .................................................. 367/38; 367/24
[58] Field of Search ........................ 367/24, 38; 364/421

[56] References Cited

U.S. PATENT DOCUMENTS 4,209,854 6/1980 Ruehle ............................ 367/43
5,365,492 11/1994 Dragoset Jr. ........................ 367/24

FOREIGN PATENT DOCUMENTS 2090407 7/1982 United Kingdom.

OTHER PUBLICATIONS

P.M. Carvalho et al, SP1.5, "Nonlinear Inverse Scattering for Multiple Suppression . . .", pp. 1093–1095.

M. Razavy, J. Acoust. Soc. Am., Vol. 58, No. 5, "Determination of the wave velocity in . . .", pp. 956–963, Nov. 1975.

H. E. Moses, Physical Review, Vol. 102, No. 2, "Calculation of the Scattering Potential . . .", pp. 559,567, Nov.1995.

J. Wendell Wiggins, Geophysics, Vol. 53, No. 12, "Attenuation of complex water-bottom . . .", pp. 1527–1539, Dec. 1988.

A. J. Berkhout, Seismic Migration, "Imaging of Acoustic Energy by Wave Field Extrapolation", pp. 185,219.

Riley & Claerbout, 2-D Multiple Reflections, pp. 592–618.

Weglein, Boyse & Anderson, Geophysics, Vol. 46, No. 8, Aug. 1991, "Obtaining three-dimensional velocity information . . .".

Stolt and Jacobs, Inversion of Seismic Data in a Laterally Heterogeneous.

Weglein & Stolt, The Wave Physics of Downward Continuation, Wavelet Estimation, and Volume and Surface Scattering.

*Primary Examiner*—Ian J. Lobo
*Attorney, Agent, or Firm*—Jacobson, Price, Holman & Stern, PLLC

[57] ABSTRACT

A method is provided for processing data representing energy passing through a medium and subjected to multiple internal reflections. The method may be applied to reflection data, in which case multiple internal reflections have an odd number of reflections, or to transmission data, in which case multiple internal reflections have an even number of reflections. An inverse scattering series is constructed and represents physical properties of the region. The series is a power series having odd and even terms. Portions of the odd data (for reflection data) or even terms (for transmission data) are selected and linearly combined with the data so as to attenuate the multiple internal reflections.

19 Claims, 4 Drawing Sheets

METHOD OF PROCESSING DATA REPRESENTING ENERGY PASSING THROUGH A MEDIUM

BACKGROUND OF THE INVENTION

1. Field of the Invention

The present invention relates to a method of processing data representing energy passing through a medium and including energy subjected to more than one reflection within the medium.

Such a method may be used in medical imaging and non-destructive evaluation, where a sample is irradiated with energy, for instance in the form of x-rays or ultrasound, in order to determine the internal structure of the sample non-invasively. Such a method may also be used in the processing of seismic reflection data, and this application of the method will be described in detail so as to illustrate the invention.

2. Description of the Related Art

Seismic reflection data consists of "primaries" and "multiples". "Multiple" is the term used in exploration seismology for energy which has been reflected downwards at least once before being detected by a seismic sensor. Multiples are classified as free-surface or internal multiples, and by their order. Free-surface multiples experience a downward reflection at the free-surface whereas internal multiples have the downward reflection at a reflector below the free-surface. In land seismic exploration, the free-surface is the upper surface of the earth whereas, in marine seismic exploration, the free-surface is the surface of the sea. A multiple can consist of a combination of free-surface and internal downward reflections. First order multiples experience a single downwards reflection, second order multiples experience two downwards reflections, and so on.

Similarly, transmission data may be contaminated by multiples. In this case, all internal multiples undergo an even number of reflections between the source and the receiver. The primary data relates to energy which has not undergone multiple reflections between source and receiver.

Since almost all processing assumes that the data consists of primaries, it is important to remove multiply reflected energy. If multiples are not removed they may (1) be misinterpreted as primaries or (2) interfere with primaries. This in turn can lead to false or inaccurate target identification and characterisation. The goal of multiple suppression methods is to remove this troublesome component, for instance of seismic reflection data, and thereby enhance the ability to process, to interpret and ultimately to make effective exploration and production decisions.

Multiple suppression is a long-standing problem in exploration seismology. Known techniques include:

(1) moveout based methods such as NMO-stack, f-k and p-τ filtering, (2) predictive methods based on periodicity assumptions, (3) wave equation modelling and subtraction methods, and (4) surface multiple removal methods.

There are many cases where these procedures are effective. However, there are also many instances where multiples remain a serious problem. The reason is that the available procedures make assumptions about the nature of the earth that are often violated in practice. One of the assumptions made by methods (1) and (2) is that the earth is one dimensional (1D) with horizontal reflectors, that is the earth consists of horizontal layers which are horizontally uniform. Curved and/or dipping reflectors and/or lateral variations in the overburden can cause problems for these 1D methods.

Methods (3) and (4) can accommodate a multi-dimensional earth. However, method (3) requires precise knowledge of the reflectors causing both the upward and downward reflections (eg see J. Wendel Wiggins, Geophysics, Vol 53 No 12, December 1988, pp 1527–1539). Method (4), the surface removal method, requires knowledge of the reflector causing the downward reflection and the source signature. For the latter method, the data transformation which removes a surface in effect removes all the downward reflections that occur at that surface.

It has been suggested (Berkhout A. J., 1982, Seismic Migration: Imaging of Acoustic Energy by Wavefield Extrapolation, Theoretical Aspects, section edition, Elsevier Science Publ. Co. Inc., pp 211–218) that the surface removal method (4) originally applied to free-surface multiples be applied in a step-wise surface stripping manner. That is, in the marine case, after free-surface multiples due to the air-water interface (sea surface) are removed, use an imaging (migration-inversion) method to locate the ocean bottom and determine its local reflectivity The surface removal method would then be applied at the water bottom. The process would continue, in this manner, moving into the subsurface, and, level by level, all multiples would be removed. Such a stripping method would require a layer by layer determination of absolute earth mechanical properties to be able to precisely image the next reflector. It is also required to have the precise determination of the angle dependent reflection coefficient at the imaged reflector. However, such a process requiring the step by step determination of absolute earth properties and precise imaging would be extremely difficult, if not impossible, for real data. The reasons are a very rapid error build up, and subsequent algorithmic failure, due to both the intrinsic limitations of real data and the assumptions (eg linear Born processing) in the current (and foreseeable) migration-inversion techniques. Thus, the surface removal methods would generally not give a viable approach to suppressing internal multiples.

For these reasons, the removal of internal multiples, especially in a multidimensional earth, remains one of the outstanding problems in exploration seismology. There are many significant exploration targets, with even relatively simple geologic structure, that are inaccessible due to the inability of current methods to remove internal multiples. Multidimensional examples, where internal multiples are difficult or impossible to remove, are easy to find. For example, FIG. 1 of the accompanying drawings is a cross-sectional view of a subterranean feature in which a target reflector 1 forms a trap below and up against the wall of a salt dome 2.

Figure 1:
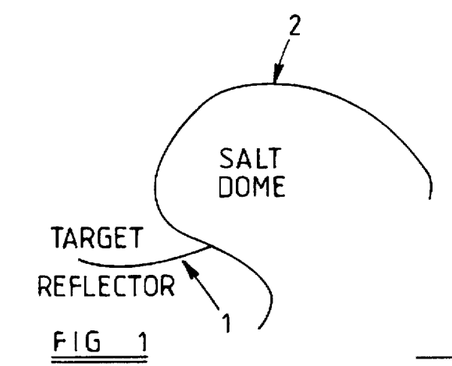
FIG. 1 is a cross-sectional view of a subterranean structure.

The internal multiples due to the salt dome 2 can interfere with and mask the target reflector 1 resulting in problems of identification, location, characterisation and evaluation of hydrocarbons. There are no methods presently available that can even partially solve this type of multiple suppression problem. The salt dome 2 is multidimensional, often three dimensional (3D), and its location and character (and the over burden) are not known well enough to be able to model and subtract (method 3) or surface remove (method 4).

In summary, there are important categories of target types that are inaccessible or where exploration seismic methods are less than effective due to the inability to remove internal multiples.

SUMMARY OF THE INVENTION

According to a first aspect of the invention, there is provided a method as defined in the appended claim 1.

According to a second aspect of the invention, there is provided a method as defined in the appended claim 14.

According to a third aspect of the invention, there is provided a method as defined in the appended claim 23.

Preferred embodiments of the invention are defined in the other appended claims.

The invention will be further described, by way of example, with reference to the accompanying drawings, in which:

DETAILED DESCRIPTION OF THE PREFERRED EMBODIMENTS

The method which is described hereinafter is based on an inverse scattering series which removes both free-surface and internal multiples. The method does not rely on periodicity or differential movement, nor does it require a model of the multiple generating reflectors. For the free-surface multiple case, the method is equivalent to a multi dimensional version of the surface removal data transformation known as "Noah deconvolution" (Riley D. C. and Claerbout J. F. (1976) 2-D Multiple Reflections, Geophysics, 41, pp 592–620).

When a wave propagates in a homogeneous medium, it is simple to predict its behaviour. If a target object is placed in the region where the wave is propagating, a difference in the incident wavefield will result due to its interaction with the target. This difference is called the "scattered wavefield". The "forward problem" in scattering theory begins with a prescribed incident wavefield on a known target object and attempts to predict what the scattered wavefield will be.

The "inverse problem," begins with an incident wavefield and a known "measured" scattered field, outside the target object, and attempts to predict the characteristics of the target object.

In seismic exploration, a man-made energy source on or near the surface of the earth generates a wavefield which propagates into the sub-surface. In this context, the "target object" corresponds to the difference between the actual earth and a homogeneous background medium. Rapid variations in earth properties (reflectors) generate a scattered field, part of which is reflected back to the surface. The purpose of exploration seismology is to use this reflection data to make inferences about the nature of the sub-surface ie the target object. The mathematical relationship between the difference between actual and reference earth properties and the reflection data is non-linear. In the prior art, practical benefit has only derived from a linear approximation to this relationship. Linear theory assumes that reflection data consists of primaries. Hence, multiples need to be removed prior to the application of linear processing or they will be misinterpreted as primaries.

The method begins with an understanding that a direct inversion procedure (in contrast to indirect inversion or data matching methods) has many tasks to perform in going from scattered data to medium properties. These include:

(1) surface multiple removal;

(2) internal multiple removal;

(3) the spatial location of reflectors; and (4) the estimation of mechanical properties and density of the medium.

The method has the potential for uncoupling these tasks. The method derives from an inverse scattering solution for the difference between the actual medium and a reference medium as a series in reflection data.

The tasks performed by individual terms, or portions of terms, in the inverse series are identified and interpreted. This identification allows different sub-series to be isolated for each of the four of tasks listed above.

For a given data type and reference medium, known techniques using the theory of inverse scattering series require at the outset the specification of model type for the wave propagation in the actual medium. That is, using the known techniques, it is necessary to specify whether the actual medium is e.g. acoustic, elastic, anisotropic or anelastic in order to construct the inverse solution. For each of these different model types, the perturbation has a specific functional relationship to the relative changes in mechanical properties and density. Since the original objective of the inverse scattering series was the identification of these relative changes, the details of those series solutions are, as expected, dependent on model type. It was therefore also reasonable to expect that the subseries of these series, selected for internal multiple attenuation, would depend on model type.

It is now believed that the inverse scattering series, and the internal multiple attenuating subseries, can be constructed for a general perturbation operator that can accommodate a large class of model types, including acoustic, elastic and certain forms of anelastic models. The series for the perturbation and the subseries for internal multiple attenuation can be written down without specifying the relationship between the perturbation and medium properties changes. Hence a single internal multiple attenuating algorithm results, no matter what earth model type, within the broad class, is assumed. The algorithm requires no information about the nature of the earth.

The inverse series approach to medium property determination has the strength of being the only direct multidimensional seismic inversion method. The tremendous weakness it suffers is that it diverges for even very small contrasts in medium properties, ie differences in properties between the actual medium and the reference medium.

However, the subseries for attenuating surface multiples (Carvalho, Weglein and Stolt, Nonlinear Inverse Scattering for Multiple Suppression: Application to Real Data, Part I (1992), SEC Expanded Abstracts, pp 1093–1095) always converges. The subseries for attenuating internal multiples described below always converges as well.

The difference between actual and reference properties is referred to hereinafter as V. The non-linear inverse series is an expansion for V in orders of the measured reflection data.

Thus, V is written as a sum:

$$V = V_1 + V_2 + V_3 + \ldots$$

where $V_1$ is the part or V that is linear in the reflection data, $V_2$ has a quadratic dependence on the data, and so on. The series approach proceeds as follows. The linear approximation $V_1$ to V is determined from the reflection data D, from a simple linear mathematical form. $V_2$ is then determined from a quadratic relationship to $V_1$ and hence to the reflection data. $V_3$ is determined from different combinations of $V_1$ and $V_2$, and so on.

Each of these operations, for instance going from $V_1$ to $V_2$, requires the use of a mathematical expression known as a "Green function" $G_0$ which describes the propagation of a wave from a first point to a second point in the homogeneous reference medium.

The procedure begins with the reflection data $D_1$ and its relation to $V_1$ as follows:

$$D_1 = G_0 V_1 G_0$$

The data $D_1$ and $G_0$ are known so that the equation can be solved for $V_1$.

$V_2$ is determined from $V_1$ and the Green function $G_0$ as follows:

$$V_2 = -V_1 G_0 V_1$$

Similarly, $V_3$ is determined from $V_1$ and $V_2$ as follows:

$$V_3 = -V_1 G_0 V_1 G_0 V_1 - V_1 G_0 V_2 - V_2 G_0 V$$

The mathematics of this step-by-step construction of the inverse series for V is known. For instance, H. Moses (1956), M. Razary (1975) and Weglein, Boyse and Anderson (1981) describe this mathematics for different equations and applications. However, what is novel is the realization that this series has to perform all of the four tasks described hereinbefore of inversion methods. Also, for the first time, a physical interpretation (in the context of the four tasks of inversion) of the mathematical formula found in terms of the inverse series is provided. Further, the physical interpretation allows "pieces" of the series to be separated out into sub-series which perform individual tasks.

Figure 2:
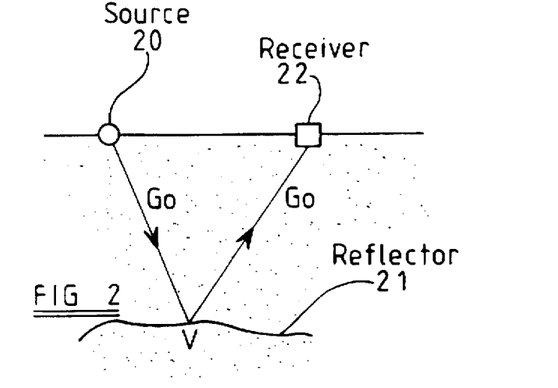
FIGS. 2 to 6 are diagrammatic cross-sections of the earth illustrating a primary reflection, two refractions, a refraction followed by a reflection, a reflection followed by a refraction, and a first order multiple reflection, respectively.

From the series for $V_1$ a series for data free from multiply scattered energy can be formed as follows. The Green function $G_0$ is used to propagate a wave from the energy source shown at 20 in FIG. 2 to the rapid variations 21 in earth properties (a reflector) represented by V. The reflected part of the incident wave $VG_0$ is then propagated back from the reflector to a receiver 22 at the surface of the earth. Data without multiply scattered energy is represented as $G_0 V G_0$, where the first Green function represents propagation up from the reflector to a seismic sensor. V represents the reflection coefficient, and the second Green function represents propagation from the energy source down to the reflector.

A series for data without multiply scattered energy may be written as:

$$D_0 = G_0(V_1 + V_2 + V_3 + \ldots)G_0$$
$$= D_1 + D_2 + D_3 + \ldots$$

where:

$$D_1 = G_0 V_1 G_0$$

$$D_2 = G_0 V_2 G_0 = -G_0 V_1 G_0 V_1 G_0$$

$$D_3 = G_0 V_3 G_0 = -G_0 V_1 G_0 V_1 G_0 V_1 G_0 - G_0 V_1 G_0 V_2 G_0 - G_0 V_2 G_0 V_1 G_0$$

Figure 3:
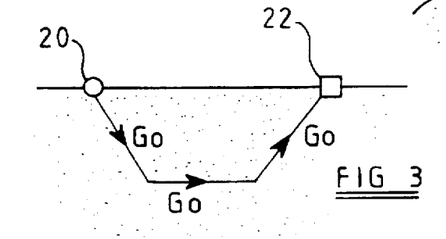

A physical interpretation of these terms has been developed. $D_1$ is the original measured reflection data. $D_2$ is interpreted as removing, when added to $D_1$, two scatterings from $D_1$ (ie two interactions with reflectors or scatterers) between the energy source 20 and the seismic sensor 22 on the surface of the earth as shown in FIG. 3. This corresponds to removing refractions of first order and is associated with tasks 3 and 4 of inversion. In order to remove refractions, it is necessary to determine the earth velocity properties. Any term in the series which corresponds to a refractive diagram (or contains even a single portion with a refractive diagram) represents an attempt to perform parameter estimation; the present method is not attempting to achieve this.

Figure 4:
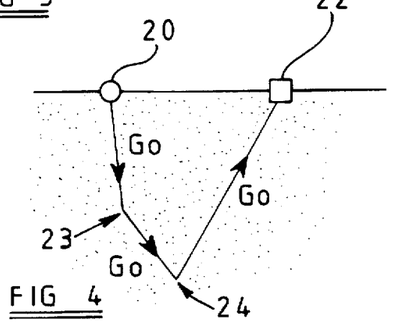

The physical interpretation of $D_3$ is more complicated. The part of $D_3$ which corresponds to $-G_0 V_1 G_0 V_2 G_0$ is interpreted as removing a refraction 23 followed by a reflection 24 as shown in FIG. 4.

Figure 5:
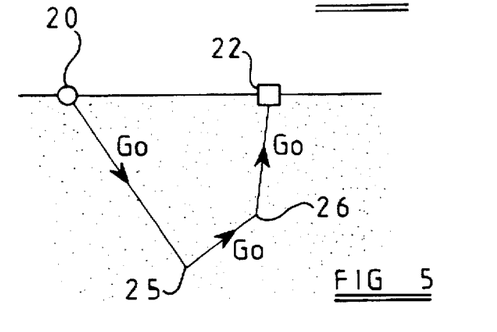

The part of $D_3$ corresponding to $G_0 V_2 G_0 V_1 G_0$ is interpreted as corresponding to removing a reflection 25 followed by a refraction 26 as shown in FIG. 5.

The part of $D_3$ corresponding to $G_0 V_1 G_0 V_1 G_0 V_1 G_0$ is interpreted as having parts corresponding to refractive components and a part corresponding to the removal of multiply reflected energy.

Figure 6:
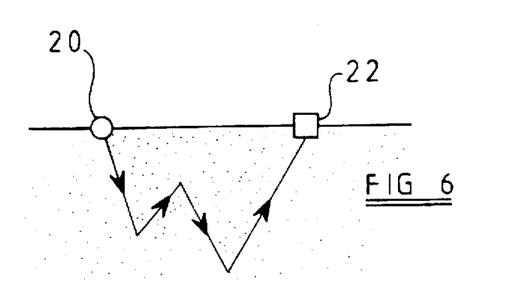

In order to have pure multiply reflected energy removal (without a single component with a refractive event removal present) only the odd terms are required and, in particular, only those pieces of the odd terms which correspond to diagrams with a change in vertical propagation direction after every interaction with $V_1^0$, for instance as illustrated in FIG. 6 for a first order multiple.

If $V_1$ is determined from the measured reflection data $D_1$ from:

$$D_1 = G_0 V_1 G_0$$

as:

$$V_1 = G_0^{-1} D_1 G_0^{-1}$$

and substituted into the diagrams and the algorithms to which they correspond, then these diagrams can be viewed as "depropagating" the original data $D_1$ using $G_0^{-1}$. Whether $V_1$ or $D_1$ or some other quantity is chosen to be put through a diagram with reversal of directions is an important decision. These reversals of directions of vertical propagation can be realised mathematically in an algorithm by imposing conditions on successive limits of integrals eg to ensure "lower" followed by "higher" followed by "lower" and back to the seismic sensor. The series which leads to multiple reflected energy attenuated data is given by:

$$G_0(V_1 + V_3{}^m + V_5{}^m + \ldots)G_0 = D_1 + D_3{}^m + D_5{}^m + \ldots$$

where $D_3{}^m$ is the portion of $D_3$ corresponding to a first order multiply reflected energy attenuated.

The present method may be considered to be based on developing a physical and diagrammatic interpretation to the inverse series, and accomplishes the much more difficult job of uncoupling internal multiple removal from reflector location and parameter estimation.

The inverse series is first interpreted as removing "small" multiple scattering order by order. It has been realised that there is a difference between multiple scattering of a given order and multiply reflected energy of the same order, from which it follows that the appropriate subseries consists only of odd terms (in contrast to surface multiples where odd and even terms are included) and, in fact, only pieces of the odd terms.

Each piece of the odd terms that is chosen corresponds to the back propagation operator always changing the sign of vertical motion after each interaction with the data. The always changing sign of the vertical back propagation portion of odd terms is interpreted as the response of the inverse series method to the task of removing multiple reflected energy.

The starting point for deriving the method is a set of equations derived in scattering theory. For the purpose of simplicity of illustration, the starting equations are given for the simple case of a normal incident wave on an acoustic 1D-inhomogeneous velocity earth configuration, that is the earth is assumed to consist of vertically stacked layers which have horizontal boundaries and which are horizontally homogeneous, and in which the velocities of wave propagation in adjacent layers are different.

The differential equation governing wave propagation for the actual earth is:

$$\left[ \frac{d^2}{dz^2} + \frac{w^2}{c^2(z)} \right] P(z,w) = 0$$

where:

z is depth;

w is the angular frequency of the wave; and c(z) is the velocity of wave propagation as a function of depth.

The corresponding differential equation for a homogeneous reference medium is:

$$\left[ \frac{d^2}{dz^2} + \frac{w^2}{c_0{}^2} \right] P_0(z,w) = 0$$

where co is the (constant) velocity of wave propagation in the reference medium. $P(z,w)$ and $P_0(z,w)$ are the wavefield in the actual and reference media, respectively.

In this context, the difference between actual and reference properties is given by V as:

$$V = w^2 \left( \frac{1}{c^2} - \frac{1}{c_0{}^2} \right)$$

A solution to this 1D acoustic inverse problem is presented in, eg Razavy M., 1975, Determination of the Wave Velocity in an inhomogenous medium from reflection coefficients, J.A.S.A. Vol 58 pp 956–963 in the form of a series for V(z) in order of the data, b(k). A method for realising multiple free data from V(z) is to form GoVGo, where Go is the Green function in the homogeneous reference medium.

The problem is that, under circumstances where multiples become noticeable and troublesome, the series for V diverges. However, a subseries of V can be derived whose purpose is the attenuation of internal multiples. It is assumed that surface multiples are either not present (ie no free-surface exists) or have been removed using the subseries described in Carvalho, Weglein and Stolt . . . (1992). The surface multiple removing subseries is always convergent.

For simplicity of illustration, taking a normally incident plane wave on a 1D acoustic medium, a subseries that leads to reflection data with internal multiples attenuated is produced as follows. The first term is the reflection data b(k) itself. The first term in the subseries for multiple attenuation is the first term in the series for V.

The subseries chooses only pieces of odd terms. The odd terms in the original series include parts representing only reflection, parts representing reflection and refraction, and parts representing only refraction. It is the parts representing only reflection which are chosen. The part of the third term in the original series of V that is the second term in the subseries for internal multiple attenuation will be called:

$$b_3(k) = \int_{-\infty}^{\infty} dz_1 e^{ik_1 b(z_1)} \int_{-\infty}^{z_1} dz_2 e^{ik_2 b(z_2)} \int_{z_2}^{\infty} dz_3 e^{ik_3 b(z_3)}$$

The portion of the fifth term chosen is:

$$b_5(k) = \int_{-\infty}^{\infty} dz_1 e^{ik_1 b(z_1)} \int_{-\infty}^{z_1} dz_2 e^{ik_2 b(z_2)} \int_{z_2}^{\infty} dz_3 e^{ik_3 b(z_3)} \int_{-\infty}^{z_3} dz_4 e^{ik_4 b(z_4)} \int_{z_4}^{\infty} dz_5 e^{ik_5 b(z_5)}$$

$b_5(k)$ forms the third time in the subseries for internal multiple attenuation.

The function b(z) is found from b(k) by Fourier transforming. Since the reflection data is collected as a function of temporal frequency $w_1 b_1(w) = b(k) = b(w/C_0)$ and the reference velocity Co is required. For the homogeneous marine case, this amounts to knowledge of the water velocity.

The multiple attenuated data will be called B(k) and is given by $B(k) = b(k) + b_3(k) + b_5(k) + \ldots$. The variables are changed from k to w, $B_1(w) = B(k)$ and the function is Fourier transformed to time, to find $B_1(t)$ which is a multiple attenuated seismic trace.

A discrete form of the algorithm may be given by a recursive relation as follows:

b(z)=reflection data as a function of pseudo depth z;

$$A_n(z_1,k) = \sum_{z_1=0}^{z_1 - \Delta z} e^{-ik_2 b(z_2)} \sum_{z_1 = z_2 + \Delta z}^{z_m} e^{-ik_1 b(z_3)} A_{n-1}(z_3, k)$$

-continued
$$b_{2n+1}(k) = \Delta z^{2n+1} \sum_{z_1=0}^{z_m} e^{-ikz_1} b(z_1) A_n(z_1,k)$$

where $\Delta z$ is the increment in z, n=1, 2, 3 ...

$A_0(z,k)=1$ and $z_m$ is the maximum value of Z.

This algorithm always converges. The amplitude of internal multiples is always attenuated. For realistic earth velocity contrasts, the multiples are essentially eliminated. The amplitudes of primaries are unchanged.

It is worth noting that the current chosen algorithm has the property that, for all tested cases, the diminution of the internal multiple is significant. However, the percentage of the multiple removed depends on the contrast in medium properties and, hence, a variable smooth background could be useful under severe contrast conditions.

The point scatterer model is implicit in both the forward and inverse scattering series. The recorded data are decomposed into a series of propagations in the reference medium and scattering from points where the actual medium differs from the reference medium. Alternate models for generating the data are possible. For example, the data can be thought of as propagation in the reference medium and scattering off surfaces, i.e. reflectors. A "reflection" in the latter model would be defined in terms of its fundamental scattering unit and would correspond to energy that changes its direction of propagation with respect to the normal to the reflector. Multiples would be defined as a combination of two or more reflections. A series of surface integrals, each known as the Kichhoff surface integral, would be required for the forward model of the data in terms of a sequence of surface contributions and propagations between them.

The multidimensional, model-type independent algorithm within the present point scatterer model will now be described.

The original recorded reflection data, $D_1(k_g,k_s;w)$, depends on $K_g$, $k_s$ and w which are the Fourier variables conjugate to the variables $x_g$, $x_s$ and t, respectively. The latter correspond to the horizontal position, on the measurement surface of the receiver and source, respectively, and t is the time after the source is activated.

A generalised reflection coefficient is defined as:

$$b_1(k_g,k_s,q_g+q_s)=2iq_s D_1(k_s,k_s,w)$$

where $q_g$ and $q_s$ are defined as:

$$q_s = \frac{w}{c_0} \sqrt{1 - k_s^2 \frac{c_0^2}{w^2}}$$

$$q_g = \frac{w}{c_0} \sqrt{1 - k_g^2 \frac{c_0^2}{w^2}}$$

and $c_0$ is the constant reference velocity.

The portion of the odd terms in the series chosen for multiple attenuation are given in terms of $b_1$ by:

$$b_n(k_g,k_s,q_g+q_s) = \frac{1}{(2\pi)^{p-1}} \int_{-\infty}^{\infty} dk_1 e^{iq_1(\xi_g+\xi_s)} \int_{-\infty}^{\infty} dz_1 e^{i(q_g+q_1)z_1} b_1(k_g,-k_1,z_1) A_n(k_1,-k_s,z_1)$$

n = 3,5,7 ...

where $A_n(k_g,-k_1,z_1) =$ $$\int_{-\infty}^{\infty} dk_2 e^{iq_2(\xi_g+\xi_s)} \int_{-\infty}^{z_1} dz_2 e^{i(-q_1-q_2)z_2} b_1(k_g,-k_2,z_2) \times$$

$$\int_{-\infty}^{\infty} dk_3 e^{iq_3(\xi_g+\xi_s)} \int_{z_2}^{\infty} dz_3 e^{i(q_2+q_3)z_3} b_1(k_1,-k_3,z_3) A_{n-2}(k_3,-k_s,z_3)$$

n = 5,7,9, ...

and $A_3(k_1,-k_s,z_1) =$ $$\int_{-\infty}^{\infty} dk_2 e^{iq_2(\xi_g+\xi_s)} \int_{-\infty}^{z_1} dz_2 e^{i(-q_1-q_2)z_2} \times$$

$$b_1(k_1,-k_2,z_2) \int_{z_2}^{\infty} dz_3 e^{i(q_2+q_3)z_3} b_1(k_2,-k_s,z_3)$$

$\xi_g,\xi_s$ are the depth locations of the receiver and source, respectively, and the q variables are defined in terms of w and k and the corresponding dispersion relation for homogenous propagation by:

$$q = \frac{w}{c_0} \sqrt{1 - k^2 \frac{c_0^2}{w^2}}$$

The series $$b^{IM} = \sum_{n=0}^{\infty} b_{2n+1}$$

is formed, and the data with internal multiples attenuated is:

$$D^{IM}(k_g,k_s,w)=(2iq_s)^{-1} b^{IM}(k_g,k_s,w)$$

This method for internal multiple attenuation requires all frequencies of the data in order to remove the internal multiple at a given frequency. In contrast, surface multiple removal methods only require data at a given frequency in order to remove surface multiples at that frequency.

As described hereinbefore, the starting point of the internal multiple attenuation method is the series solution for the inverse scattering problem. This can be written under very general circumstances.

The inverse scattering integral equations and the resulting series for parameter estimation were described for a 3D inhomogeneous earth in Weglein, Boyse and Anderson Geophysics, Vol 46, No 8, August 1991, pp 1116–1120. Stolt and Jacobs Sep. 24–25 (1981), and Weglein and Stolt "Mathematical Frontiers in Reflection Seismology" Ed W W Symes SIAM Philadelphia 1993 for the case of an acoustic variable velocity and constant density, acoustic variable velocity and variable density, and the elastic-multicomponent situation where P-wave velocity, S-wave velocity, and density are all variable, respectively. The subseries selection criteria are applicable to all of these model and data types. Hence, the entire internal multiple attenuation procedure is generalisable.

The details of the computation will depend on the measured data type but not on any details of the subsurface. The multiple attenuation algorithm may be independent even of model type for the perturbation for a class of models including acoustic, elastic and certain forms of anelastic, but this has not yet been tested. The specific algorithm will depend on the model type of the reference medium.

Figure 7:
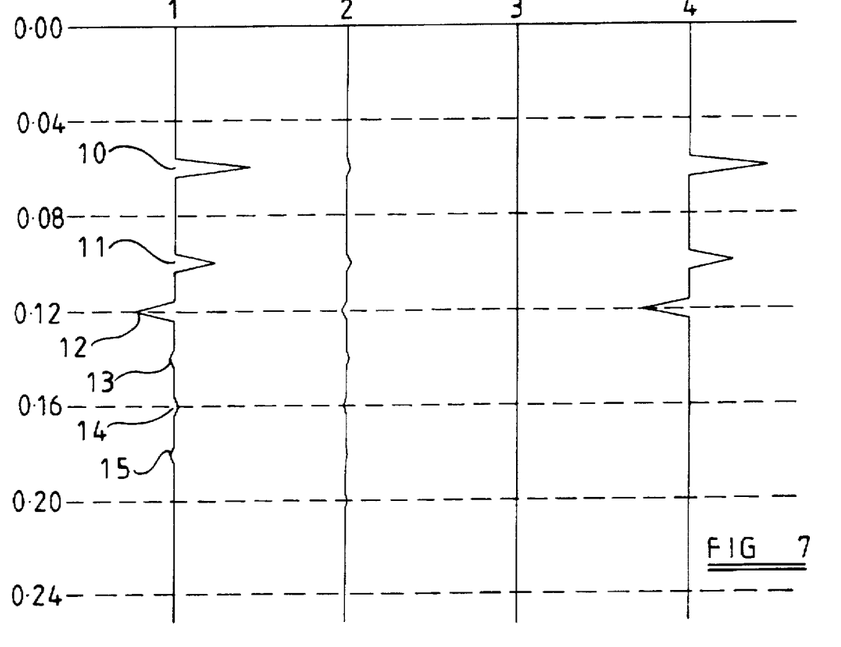
FIG. 7 illustrates graphically the use of a method constituting a preferred embodiment of the invention on synthetic data.
Figure 8:
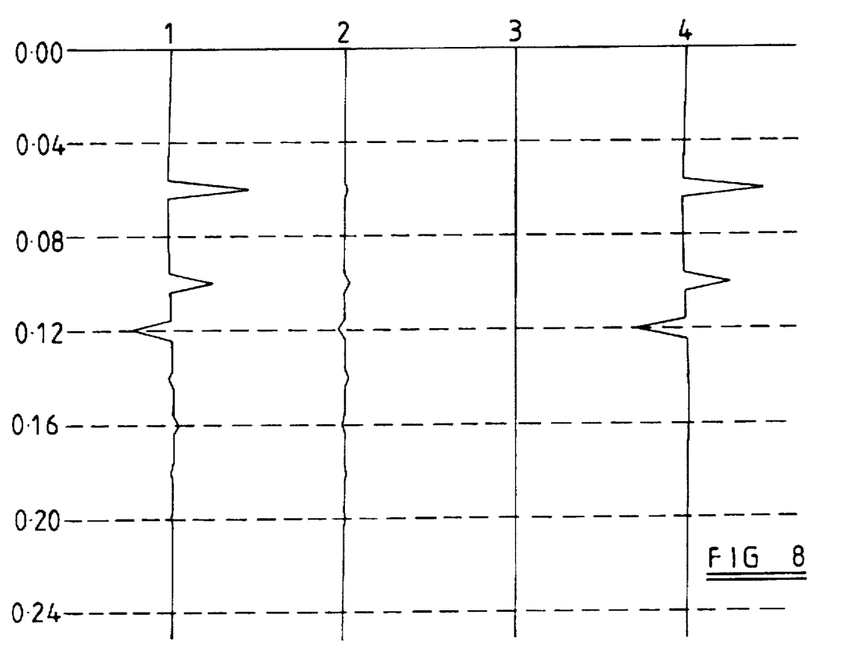
FIG. 8 corresponds to FIG. 7 for modified synthetic data.

FIGS. 7 and 8 illustrate the application of the method to 1D examples using synthetic seismic data. In each of these figures, the left trace labelled "1" on the horizontal axis shows the actual synthetic data b(z) and corresponds to what would be recorded during seismic surveying. The trace in FIG. 7 has primaries at 10, 11 and 12 and multiples at 13, 14 and 15. The vertical axis is calibrated in seconds and represents the time since a hypothetical energy source was actuated. The trace labelled "2" shows the portion $b_3(z)$ of the third term of the series which is selected as the second term of the sub-series. The trace labelled "3" corresponds to $b_5(z)$. Trace "4" is the output of the method and comprises the sum:

$$B(z)=b(z)+b_3(z)+b_5(z)$$

where z is $c_0 t/2$.

As is apparent from FIG. 7, the multiples have been attenuated in the trace "4" to such a degree that they are virtually invisible. A side effect of this method is that there is an increase in the amplitudes of the primaries but, in practice, this does not matter. In fact, by re-scaling B(z) so that the amplitudes of the parameters correspond to those in b(z), the multiples are attenuated even more.

FIG. 7 shows that the higher order terms of B(z) make little contribution to the sum. In practice, in many circumstances, it may be sufficient to limit the sum B(z) to very few of the lowest order terms, such as $b_3(z)$ and $b_5(z)$, or even only $b_3(z)$, in order to limit the amount of computation required while achieving acceptable attenuation of multiples.

The data shown in FIG. 7 correspond to a full bandwidth pulse, ie containing all frequencies from zero to the Nyquist frequency for a sampled signal, being used to obtain the data. In practice, the lowest frequencies are not produced. FIG. 8 therefore illustrates the same but with a filter applied to remove the low frequency information. As can be seen by comparing FIGS. 7 and 8, the method remains effective.

Figure 9:
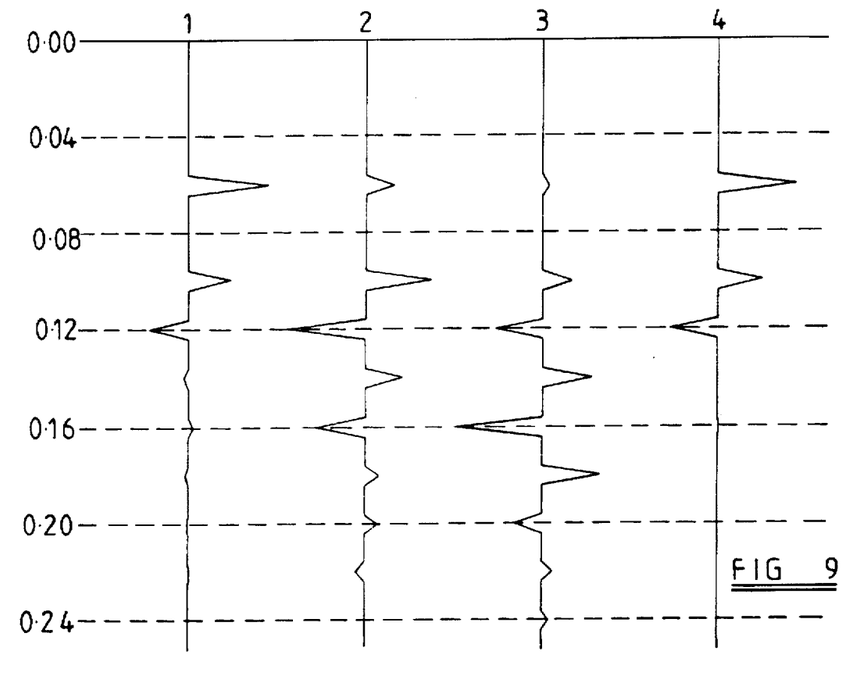
FIGS. 9 and 10 show the data of FIGS. 7 and 8, but each trace has been re-normalised so as to have the same maximum amplitude.
Figure 10:
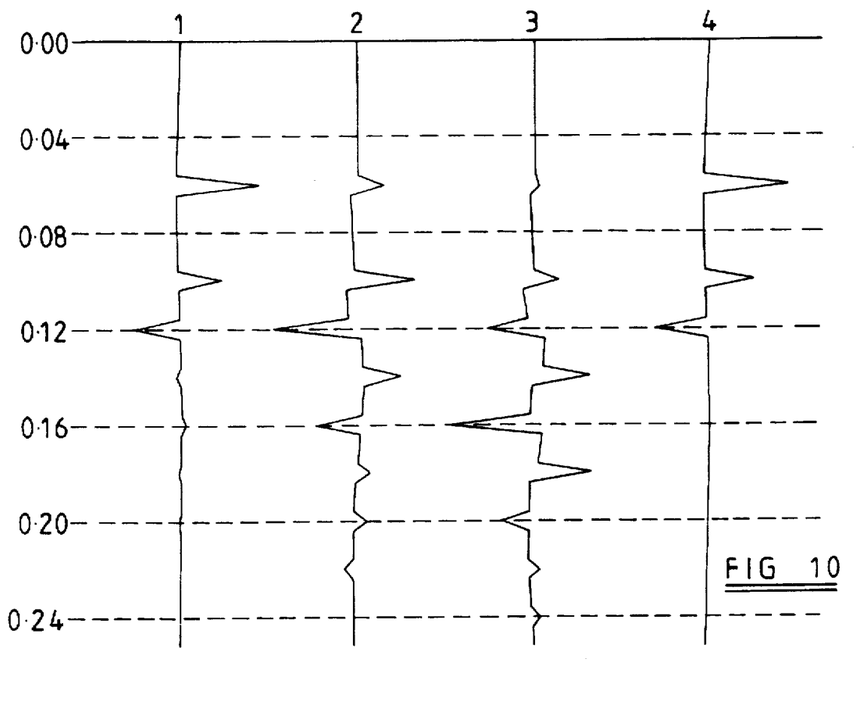

FIGS. 9 and 10 repeat the data shown in FIGS. 7 and 8, respectively, but each trace has been re-normalised to as to clearly illustrate the contribution made by each of the terms.

In contrast to the entire series, the subseries for internal multiples always converges and very weakly depends on low frequency information. The rest of the series (which deals with goals (3) and (4)) rarely converges and is very sensitive to low frequency information.

What was originally imagined as a unique prescription for subseries selection actually turns out to have several degrees of freedom. The "changing sign of vertical propagation in odd terms" concept can be realised in different and nonequivalent ways.

Although the method has been described with reference to the z domain and the back-propagated quantity was b(z), there are many other possible domains and back propagated quantities with which the method may be used, each combination having its own set of strengths and weaknesses. Further, the method may be applied to reflection data other than seismic reflection data in order to attenuate multiple internal reflections. An advantage of the method is that it requires no knowledge of internal structure of the "target".

Figure 11:
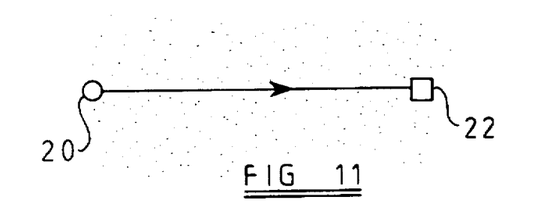
FIGS. 11 to 14 are diagrammatic cross-sections of the earth illustrating a primary transmission, a first order multiple reflection, a refraction, and two reflections followed by a refraction.
Figure 12:
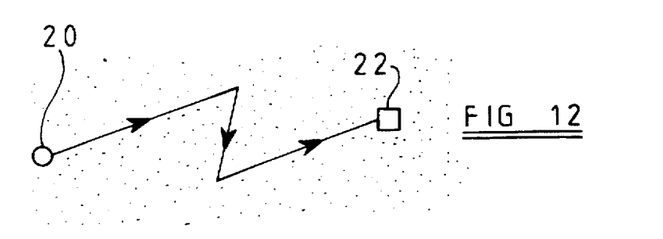
Figure 13:
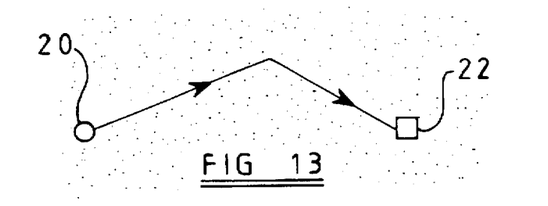
Figure 14:
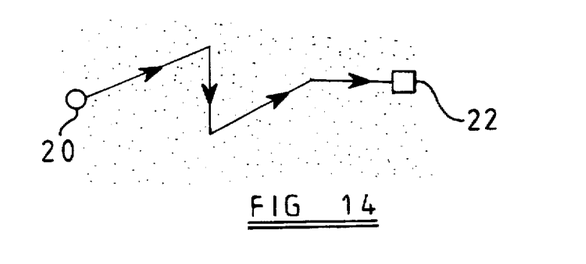

The method may also be applied to transmission data so as to remove or attenuate multiple internal reflections. Such a technique may be used with seismic transmission data or in other fields, for instance so as to remove or reduce the effects of multiple internal reflections in tomography. For the seismic case, FIG. 11 illustrates the path from a source 20 to a receiver 22 of seismic energy being used to investigate the transmission properties of the earth. FIG. 12 illustrates a multiple reflection path. FIG. 13 illustrates a single refraction path, and FIG. 14 illustrates a multiple reflection and refraction path between the source 20 and receiver 22. Thus, as in the case of reflection data, the direct or desired signal is contaminated by signals which are reflected and/or refracted and it is desirable or essential to attenuate or remove these artifacts.

The techniques described hereinbefore for reflection data may be applied directly to transmission data with the difference that it is portions of the even order terms of the series, instead of the odd order terms, which represent multiple reflections. Again, the method is not applied to the problem of dealing with any propagation paths involving refractions but is limited to dealing with the problem of "pure" multiple reflection paths. Thus, multiples of the type shown in FIG. 12 can be attenuated in transmission data using this method, but more complex propagation paths involving refractions as shown in FIGS. 13 and 14 are not dealt with by the method.

The procedure described above, for attenuating internal reverberations from waves probing a medium, has application beyond the seismic reflection context for which it has been described. In general, the procedure may be used with advantage whenever a wave of any type is used to interrogate a medium and where the processing of the measured wavefield assumes that there are no internal reverberations in the data. This assumption can, and often does, lead to inaccurate or misleading interpretations in fields as far apart as medical imaging and crack evaluation of airplane wings. Medical surgery is often undertaken based on tomograms that misinterpret these reverberations as a "real" deviation from normal tissue. The ability to correctly diagnose an actual problem can also be impeded by overlapping multiples from shallower changes which the probing wave has experienced.

Some further applications of this procedure to exploration and production of hydrocarbons are as follows.

(1) Acoustic Wave Propagation (1a) Vertical Seismic Profiling (VSP). In VSP applications, energy sources are located on the surface and receivers are located in the subsurface along a borehole. Geophones closer to the geologic horizons can provide a more detailed stratigraphic picture. It is believed that the application of the internal multiple attenuation procedure to offset VSP data can enhance its value and allow it to be a more effective complement to surface reflection data.

(1b) Measurement derived from acoustic sources and receivers in a borehole. Acoustic sources located in the borehole are used to determine (1) the corrosion of the outer surface of the pipe. (2) the third interface, i.e. the borehole wall, and (3) formation properties near the borehole. These technologies impact on well development from drilling to production. Receivers are either coincident with the source or offset from it along the borehole. The frequency range and radiation pattern of the source differ with the different applications. In the second and third of the applications listed above, the reverberation of the wave in the pipe can have a deleterious effect on reaching the objective. Thus, the attenuation of that internal multiple can enhance the efficacy of those methods.

(2) Electromagnetic Wave Propagation.

(2a) Source in one well and receiver in a nearby well. The objective in the crosswell geometry is to determine the electromagnetic properties between the wells from the character of the wave transmitted between them. Current inversion procedures assume a direct path between source and receiver, and can suffer errors when internal multiples are present. As described above with reference to FIGS. 11 to 14, transmission data require a modification of the algorithm detail, but not the concept for removing internal multiples. In the inverse series, portions of the even terms corresponding to changing direction of vertical depropagation after each interaction with the data are selected. All odd terms are omitted. The primary interest of this application is in production for reservoir control and monitoring.

(2a) Ground penetrating radar. This electromagnetic reflection technique on the surface of the earth is used to estimate near surface properties. Multiples can cause problems and removng them can add value to the method.

In addition to the medical imaging and nondestructive material evaluation applications mentioned hereinbefore, other applications include:

(1) geophysical probes to locate and identify buried objects, e.g. tunnels, unexploded ordinance, and buried waste.

(2) the identification of nuclear and atomic potentials.

We claim:

1. A method of processing data representing energy passing through a medium and including energy subjected to more than one, reflection within the medium, the method comprising the steps of:

constructing an inverse scattering series representing physical properties of the medium, the series comprising a power series in the data having a first order term and at least one term of higher order;

selecting a portion of at least one of the at least one higher, order term, the or each selected portion representing energy reflected a number of times within the medium which number is equal to the order of the respective term; and linearly combining the data with the or each selected portion so as to represent energy in which the energy reflected more than once within the medium is attenuated.

2. A method as claimed in claim 1, in which the data representing energy passing through the medium correspond to energy having a predetermined wavefront shape incident on the medium.

3. A method as claimed in claim 2, in which the wavefront shape is plane.

4. A method as claimed in claim 1, including preprocessing measured data from at least one energy receiver by Fourier transforming the measured data so as to provide the data representing energy passing through the medium.

5. A method as claimed in claim 1, in which the data represent energy reflected from the medium, the power series has odd and even order terms, and the selecting step comprises selecting a portion of the or each of at least one of the odd order terms representing energy reflected an odd number of times within the medium.

6. A method as claimed in claim 5, including a preliminary step of modifying the data to represent reflected energy from which energy reflected at an external boundary of the medium has been attenuated or removed.

7. A method as claimed in claim 1, in which the data represent energy transmitted through the medium, the power series has odd and even order terms, and the selecting step comprises selecting a portion of the or each of at least one of the even order terms representing energy reflected an even number of times within the medium.

8. A method as claimed in claim 1, in which the inverse scattering series comprises an inverse scattering solution for the difference between the medium and a reference medium.

9. A method as claimed in claim 8, in which the reference medium is a homogenous medium.

10. A method as claimed in claim 8, in which the reference medium is a smoothly varying medium.

11. A method as claimed in claim 8, in which the reference medium has a physical property corresponding to a portion of the medium which portion contains a source of the energy and a receiver for receiving energy passing through the medium.

12. A method as claimed in claim 11, in which the physical property is wave propagation velocity.

13. A method as claimed in claim 1, in which the data are seismic data.

14. A method of processing reflection data representing energy reflected from internal boundaries within a region and including energy reflected by more than one of the internal boundaries, the method comprising the steps of:

constructing an inverse scattering series representing physical properties of the region, the series comprising a power series in the reflected data having odd and even order terms;

selecting a portion of the or each of the odd order terms representing energy reflected by more than one of the internal boundaries; and linearly combining the reflection data with the or each portion so as to represent reflected energy in which the energy reflected by more than one of the internal boundaries is attenuated.

15. A method as claimed in claim 14, comprising a preliminary step of modifying the reflection data to represent reflected energy from which energy reflected at an external boundary of the region has been attenuated or removed.

16. A method as claimed in claim 14, in which the inverse scattering series comprises an inverse scattering solution for the difference between an actual medium within the region and a reference medium.

17. A method as claimed in claim 16, in which the reference medium has a physical property corresponding to a portion of the actual medium containing a source of the energy and a receiver for reflected energy.

18. A method as claimed in claim 17, in which the physical property is wave propagation velocity.

19. A method as claimed in claim 14, in which the data are seismic data.

* * * * *